United States Patent
Neal et al.

[11] Patent Number: 5,660,206
[45] Date of Patent: Aug. 26, 1997

[54] FUEL TANK FILLER NECK CHECK VALVE

[75] Inventors: Timothy P. Neal, Harwington; Mark R. Johansen, Cheshire, both of Conn.

[73] Assignee: Walbro Corporation, Cass City, Mich.

[21] Appl. No.: 428,340

[22] Filed: Apr. 25, 1995

[51] Int. Cl.⁶ .................................................. F16K 15/14
[52] U.S. Cl. ................. 137/592; 137/512.15; 137/515.5; 137/854; 285/346
[58] Field of Search .................. 137/512.15, 515.5, 137/587, 588, 590, 592, 854; 285/346, 348, 354

[56] References Cited

U.S. PATENT DOCUMENTS

| | | | |
|---|---|---|---|
| 2,258,941 | 10/1941 | Wayman | 285/346 X |
| 2,494,849 | 1/1950 | Whitney | 285/346 |
| 3,182,682 | 5/1965 | Gilliam | 137/515.5 |
| 3,185,508 | 5/1965 | Bender | 285/346 X |
| 3,605,132 | 9/1971 | Lineback | 137/854 X |
| 3,911,949 | 10/1975 | Hilden et al. | 137/854 |
| 4,646,772 | 3/1987 | Bergsma | 137/39 |
| 4,751,940 | 6/1988 | Bergsma et al. | 137/199 |
| 4,753,262 | 6/1988 | Bergsma | 137/39 |
| 4,776,369 | 10/1988 | Lardner et al. | 137/515.5 |
| 4,907,616 | 3/1990 | Bergsma | 137/38 |
| 4,960,153 | 10/1990 | Bergsma | 137/587 |
| 4,974,645 | 12/1990 | Johnson | 137/587 X |
| 5,054,508 | 10/1991 | Benjey | 137/43 |
| 5,062,444 | 11/1991 | Bergsma | 137/202 |
| 5,083,583 | 1/1992 | Benjey | 137/587 |
| 5,282,497 | 2/1994 | Allison | 137/588 X |
| 5,327,871 | 7/1994 | Gryc | 137/590 X |

*Primary Examiner*—John Rivell
*Attorney, Agent, or Firm*—Barnes, Kisselle, Raisch, Choate, Whittemore & Hulbert

[57] ABSTRACT

A filler neck of a fuel tank extends from the gas cap to the interior of a fuel tank, and a fill valve insert is positioned adjacent the tank-interior end of the filler neck in a tank/neck coupler construction. The insert carries a flexible valve to close the interior end of the filler neck, and the valve is designed and mounted both to flex open and bodily move downstream to both open and rapidly enlarge the valve opened passageway in response to rapid inflow of fuel to the tank, and to return and revert to a closed position upon cessation of fuel inflow. The fill valve insert is positively positioned and held in the interior of a threaded spout on the fuel tank and is retained and sealed against the filler pipe by a threaded collar screwed onto the threaded spout. In the event the filler neck is pulled loose from its frictional clamp fit in the tank/spout collar by vehicle crash forces, the tank spout will remain closed and sealed by the valve insert remaining retained by the collar in the spout to thereby prevent fuel spillage from the tank.

8 Claims, 1 Drawing Sheet

FUEL TANK FILLER NECK CHECK VALVE

FIELD OF THE INVENTION

This invention relates to fuel tanks for storing liquid fuels and more particularly to filler neck and check valves for filling such tanks with fuel.

BACKGROUND OF THE INVENTION

Environmental awareness has prompted numerous efforts to reduce the escape of gasoline fumes and liquid into the atmosphere, as from vehicle fuel tanks, particularly when filling the tank with fuel. Attention is now being given to fuel filling stations where self-service is now more common than service by gas station attendants. Customer self-service in the vehicle fuel tank filling operation aggravates the air pollution problems already associated with vehicle gasoline tank filler necks, which of course must be left open with the associated outside gas cap removed during tank filling. Excessive tank open time often results from improper customer operation of the fuel pump hose nozzle, such as leaving the same in the fill tube longer than necessary for tank filling while the gas cap is off and hence the tank is open via the filler neck to ambient atmosphere. Fuel splash back from the tank into and up out of the filler neck to ambient atmosphere as the tank approaches full level is also aggravated by amateur customer self-service.

OBJECTS OF THE INVENTION

It is an object of the present invention to provide an improved fuel tank and filler neck with a tank neck coupling construction which is adapted to use a non-return valve which opens to allow free flow for fuel entering a tank but which responds instantly to close the fuel tank filler neck when the flow of entering fuel is stopped to thereby prevent escape of liquid fuel and fuel vapors from the tank even with the gas cap open at the top of the filler neck.

Other objects are to provide an improved valve construction of the aforementioned character which can be retrofitted into existing tank necks without expensive redesign, and made of inexpensive materials with low mass which has a quick response to close the neck when fuel inflow is stopped to thereby prevent splash-back of fuel from the tank into and up out of the filler neck.

A further object is to provide an improved valve and tank/neck coupling construction of the aforementioned character that in the event the filler neck is pulled loose from the tank fill spout in a vehicle crash, will maintain the tank fill spout sealed closed to prevent crash induced fuel spillage from the tank via the fill spout.

SUMMARY OF THE INVENTION

In a filler neck installation of a fuel tank wherein the neck extends from the gas cap downwardly to the fuel tank, a fill-valve insert is telescoped around the depending tank end of the filler neck. This insert has an upper annular ring to receive and seal around the exterior of the tank end of the filler neck, and a lower annular valve seat encircling an insert through-passageway communicating with the neck tank-filling passageway. A flexible disc valve is center supported on a spider arm in the insert and cooperates with the valve seat to function as a one-way check valve at the tank outlet of the filler neck. A resiliently biased slide pin has a central button which supports the disc valve slidably on the spider for bodily travel of the valve disc in an opening direction far away from the valve seat to thereby reduce valve flow restriction, and allowing the disc valve to open rapidly and widely in response to fuel inflow, and responding to the ceasing of the flow to quickly move the valve disc back into position to close the annular valve seat. The insert valve remains closed and the insert assembly is positively retained against outward dislodgement from the tank fill spout by a lock ring collar in the event the filler neck is pulled loose from its compression seal frictional clamp retention in the collar, such as might occur in a vehicle crash.

BRIEF DESCRIPTION OF THE DRAWING

These and other objects, features and advantages of the invention will be apparent from the following detailed description of the preferred embodiment and best mode presently contemplated for the invention, the appended claims and accompanying drawing in which:

DETAILED DESCRIPTION OF THE INVENTION

Figure 1:
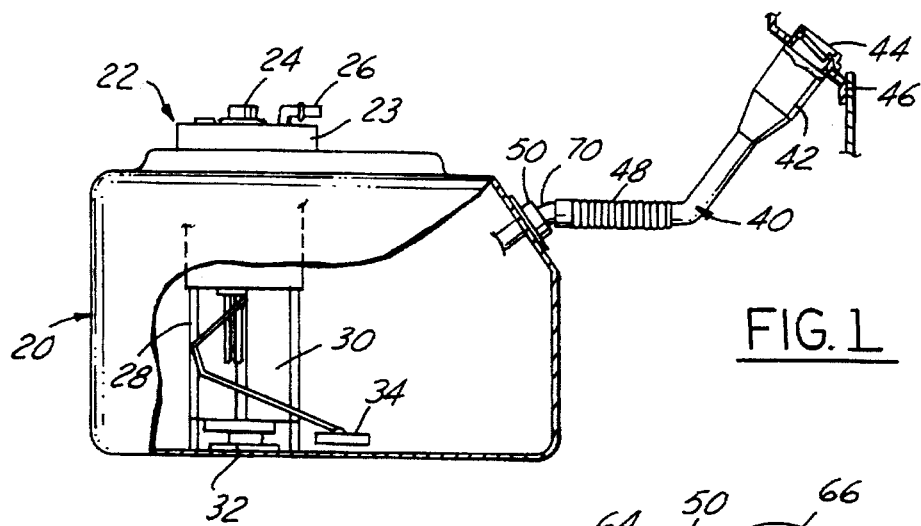
FIG. 1 is a diagrammatic view of a fuel tank and filler neck embodying the present invention, with portions broken away to illustrate tank-interior details.

In FIG. 1, an automotive vehicle fuel tank 20 has a fuel pump module 22 therein with a removable cover 23 sealed to the top of the tank with an electrical connection 24 and a fuel line outlet connector 26. Within the tank the module 22 has a fuel reservoir 28 which contains an electrical pump 30 with an inlet 32. A float gage 34 is provided to indicate fuel level. A tank filler neck tube 40 has a top end 42 provided with a removable gas cap 44 and mounted in the vehicle body 46. A flex segment 48 connects the neck 40 with a tank fill connector collar assembly 50 shown in detail in FIG. 2.

The fuel tank 20 is formed of laminated polyethylene material 60 (with an embedded vapor barrier film) and has an integral upstanding threaded fill spout 62. A fill tube lock ring assembly comprises a cup-shaped collar 64 which has a threaded seal liner 66 formed with an inner ring flange 68 surrounding, sealing against and frictionally clamping the outer surface of the lower end 70 of the filler neck 40. A main ring seal 72 of flexible sealing material also surrounds, seals and frictionally clamps against tube end 70, and is received and contained in spout 62 between it and filler pipe end 70. An annular bead 74 of collar liner flange 68 bears against a U-cross sectional pressure wear ring 76 which is located above and pressed into ring seal 72 as collar 64 is threadably tightened down on spout 62 to develop fill-tube-mounting frictional clamp pressure and to simultaneously compress seal 72 into a liquid and gas tight seal between the spout and fill tube end.

The fill neck/tank coupler construction of the invention further includes a tank-entrance check valve insert assembly 80 slip-fit attached to the fill tube tank outlet end 70. Insert assembly 80 contains a check valve structure which opens widely to allow a high flow rate of fuel to enter the tank, but when fuel inflow is shut off at the service station fuel pump nozzle the check valve quickly closes the fill tube outlet to prevent fuel splash back up the open fill tube, and also escape therethrough of fuel vapor from the tank.

Figure 2:
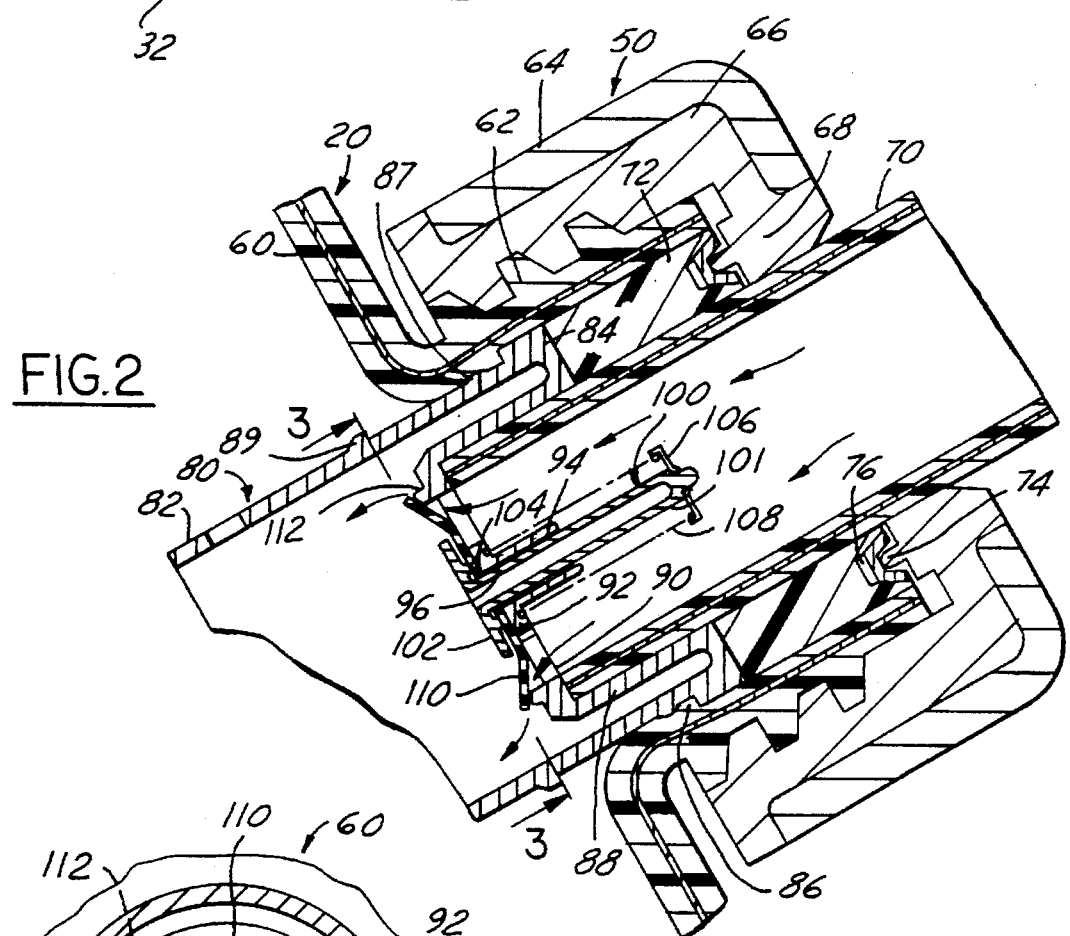
FIG. 2 is a fragmentary axis-centered sectional view of the filler valve tank connection with the details of the tank entrance valve of the invention.
Figure 3:
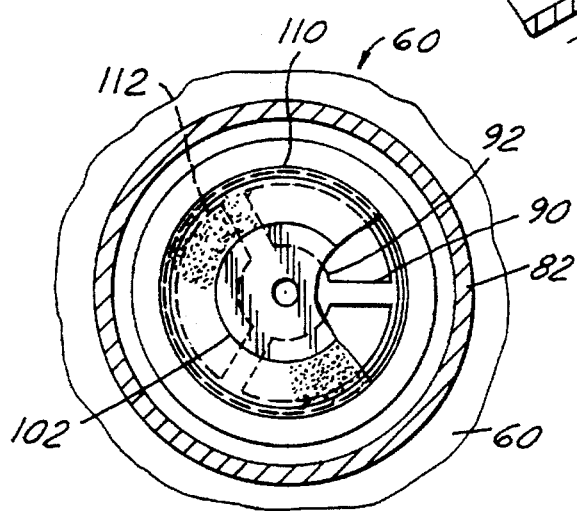
FIG. 3 is a fragmentary cross-sectional view taken on line 3—3 of FIG. 2.

Valve insert assembly 80 has a tubular mounting portion 82 which terminates at the top end, as viewed in FIG. 2, in a shouldered ring 84. Tubular portion 82 is installed by inserting it tank-end first into the exterior end of tank spout 62 until shouldered ring 84 abuts an internal shoulder 86 provided on the inside of spout 62. Preferably the tubular portion 82 also has an annular detent ring 87 which snaps into a complimentary retainer groove in the fill spout 62. Installation is also facilitated by a cam ring 89 on the tubular portion which also "loosely" retains it in the fill spout 62. Seal ring 72 as installed abuts the top of ring 84 and cooperates with lock ring collar 64 to positively prevent removal of insert 80 from the spout once so installed.

Insert assembly 80 also has an inner depending re-entrant tubular portion 88, spaced inwardly of and concentric with portion 82 and terminating in a generally open, tri-legged spider base having three radial legs 90 integral therewith. The legs mount an integral central valve support disc 92 and a guide sleeve 94 that protrudes upstream inwardly from tube end 70. A preferably stainless steel T-shaped valve carrier 100 having a hollow slide pin shank 101 terminates at its bottom end integrally in a button head 102 having an annular sealing rib 104 facing upstream. A coil spring 108 is abutted between the central valve support 90/92 and a lock cap 106 fixed on the top of pin 101 that urges carrier 100 and associated button head 102 upwardly (upstream).

A movable valve seat sealing member of valve insert assembly 80 is loosely disposed between button head 102 and the support disc 92 and comprises a flexible resilient silicone rubber flapper disc 110 having a central hole through which passes carrier shank 101. Disc 110 has a outside diameter such that its periphery overlies and extends beyond an annular valve seat 112 integrally formed on the downstream end of depending tubular portion 88. Valve disc 110 has sufficient resilience to allow it to flex downstream to partially wrap around head 102 during and in response to rapid fuel inflow down tube 70, but a resilient memory which causes it to return to the generally planar or frusto-conical closure position and shape shown in FIG. 1 to sealably engage valve seat 112 when no fuel is present upstream of the valve disc. When the valve is closed the resilient disc and the annular rib 104 of the valve carrier provide a seal between them.

To assemble the parts, valve insert assembly 80 is positioned in threaded spout 62 with shouldered ring 84 bottomed against spout shoulder 86. Main sealing ring 72 is next inserted in spout 62 and secondary ring 76 placed against its upper end. The cup-shaped lock ring collar 64 containing the threaded liner 66 is then loosely threaded down onto spout 62. Next the lower end of the fill pipe 70 is slidably inserted through ring flange 68, main seal 72 and into tubular portion 88 of valve insert 80 to thereby preferably position tube end 70 on the bottom shoulder of the tubular portion 88 and preferably protruding slightly into tank 20 as shown in FIG. 2. After the fill pipe is inserted, the threaded lock ring collar 64 can then be threadably tightened down to cause the annular bead 74 to axially compress the seals 72 and 76 and radially expand seals 72 the main seal 72 for liquid and vapor sealing between tube 70 and spout 62 and to thereby frictionally clamp the filler neck 40 to the tank.

In operation when liquid fuel is introduced into the open top of the fill pipe 40 from the hose pump nozzle at the station pump, with gas cap 44 open or removed, the rapid fuel flow in the direction of the arrows in FIG. 2 will force open the flexible perimeter of the rubber disc 110 (bend it in the downstream direction) and also force it to move bodily along with button head 102 downstream against the biasing force of spring 108. This fuel inflow must not be unduly restricted because to do so would cause premature shut-off of the pump nozzle by its automatic shut-off mechanism. Hence the calibration of spring 108, the flexing of the disc 110 and the downstream bodily travel of valve disc 110 on carrier 100 away from valve seat 112 must be such that a flow of fuel at the rate of twelve to fifteen gallons per minute will pass freely into the fuel tank.

When the fuel inflow from the pump nozzle is cut off, spring 108 will force carrier 100 to move slidably and quickly in the upstream direction back to its position shown in FIG. 2. This motion in conjunction with the yieldably resilient recovery of the rubber disc 110, will rapidly and almost immediately close disc 110 sealably against seat 112 to thereby prevent liquid splash back and/or the escape of fuel vapor from the tank to the atmosphere via tube 70. Of course, excess vapor pressure in the tank headspace acting on disc 110 and/or liquid fuel splashed from the tank interior toward the fill pipe outlet against disc 110 will accelerate such spring-biased and flap recovery valve closing action.

In accordance with another feature of the invention, filler neck end 70 could be yanked loose from collar assembly 50 by extreme pull-out forces generated in some vehicle crashes due to its frictional slip fit and clamping in the collar without damaging or rupturing the integrity of the tank 20. However, in such event valve insert assembly 80 remains securely fastened in and to tank spout 62 by the positive retention of collar structure 64/66/68 acting on seal 72 to hold insert shoulder 84 against spout shoulder 86 and detent ring 87. Hence the flow opening defined by valve seat 112 in the inner end of the insert will remain sealed by valve 110, and seal 72 will retain sufficient sealing capability to prevent fuel leakage between insert 80 and spout 62.

What is claimed is:

1. In a fuel tank for fuel to power an internal combustion engine, a fuel fill pipe having an interior conduit leading from a fill gas cap to the interior of a fuel tank, and a one-way valve assembly located in assembly with the fill pipe within the fuel tank and operable to allow free flow of fuel into the tank via the pipe conduit and to close against splash-back and fuel vapor tending to escape from the tank via the fill pipe conduit, said one way valve assembly has a valve insert housing surrounding the inner end of the fill pipe within the tank and having a through-passageway communicating the fill pipe conduit with the tank interior, a valve seat on said housing encircling said through-passageway, a valve support base in said housing adjacent said valve seat, a flexible disc on said support base having a periphery closing the inner end of said fill pipe, and a support of said disc to allow the periphery to flex inwardly away from said valve seat to pass incoming fuel into the tank.

2. A value assembly as defined in claim 1 in which said support of said disc comprises a carrier slidable on said support base and resiliently biased axially upstream relative to fuel inflow, and a flexible disc support head on said carrier on the downstream side of said flexible disc, said carrier being positioned to bodily move said valve disc downstream away from said valve seat in response to rapid inflow of fuel from the pipe conduit impinging against the valve disc, and to move said valve disc bodily upstream to its valve-seat closing position upon cessation of said flow.

3. A valve assembly as defined in claim 1 in which said valve insert housing is formed with an internal peripheral shoulder on said support base, and the inner end of said fill pipe abuts said peripheral shoulder in assembly.

4. A valve assembly as defined in claim 3 in which said tank has a threaded upstanding spout, a first shoulder internally of said spout, and a second peripheral external shoulder on said valve insert housing to abut and lodge against said first shoulder to position said valve insert housing axially in said spout, and a main seal encircling said pipe adjacent said valve insert shoulder.

5. A valve assembly as defined in claim 4 in which a threaded cup-shaped external connector collar threads onto said upstanding spout on said tank, and a peripheral portion internally of said connector collar is positioned axially to contact and compress said main seal when said connector collar is tightened on said upstanding collar of said tank, said inner end of said fill pipe being inserted through said main seal during assembly thereto and then frictionally clamped by a threadably tightening said collar on said spout to axially compress and radially expand said seal between said fill pipe end and said spout.

6. In a fuel tank for fuel to power an internal combustion engine, a fuel fill pipe and one-way valve assembly comprising; a fuel fill pipe having an interior conduit leading from a fill gas cap to the interior of a fuel tank, a housing carried by the fuel tank and in assembly surrounding the inner end of the fill pipe and having a through-passageway communicating the fill pipe conduit with the interior of the fuel tank, a valve seat carried by the housing and encircling said through passageway, a valve support on the housing and adjacent the valve seat, a flexible valve disc carried by the valve support and having a portion adjacent its periphery which when bearing on the seat closes the inner end of the fill pipe, and the peripheral portion of the disc will flex inwardly away from the value seat to pass incoming liquid fuel into the tank to allow free flow of liquid fuel into the tank via the fill pipe conduit and when there is no liquid fuel in the fill pipe will close on the valve seat against the back splash of liquid fuel and fuel vapor tending to escape from the tank via the fill pipe conduit.

7. The fill pipe and one-way valve assembly as defined in claim 6 which also comprises a carrier connected to the disc, carried by the support and mounting the disc for movement generally axially relative to the seat to bodily move the disc downstream away from the valve seat in response to rapid inflow of liquid fuel from the pipe conduit impinging against the valve disc and yieldably biased to move the valve disc bodily upstream to its valve seat closing position when no liquid fuel is in the fill pipe.

8. The fill pipe and one-way valve assembly as defined m claim 6 in which the tank has a spout, the valve housing is received in the spout, the fill pipe is telescopically received in the spout and the valve housing, a main seal encircles the fill pipe and is received in the spout, and a collar is received on the spout of the tank and constructed and arranged to axially compress and radially expand the main seal between the fill pipe and the spout to provide a seal between them and to frictionally retain the fill pipe in the tank spout.

\* \* \* \* \*

UNITED STATES PATENT AND TRADEMARK OFFICE
CERTIFICATE OF CORRECTION

PATENT NO. : 5,660,206

DATED : August 26, 1997

INVENTOR(S) : Timothy P. Neal and Mark R. Johansen

It is certified that error appears in the above-indentified patent and that said Letters Patent is hereby corrected as shown below:

Col 5, Line 13, after "by" delete "a".

Col 6, Line 2, change "value" to "valve".

Signed and Sealed this

Second Day of December,1997

*Attest:*

BRUCE LEHMAN

*Attesting Officer*  *Commissioner of Patents and Trademarks*